United States Patent
Grobman et al.

(10) Patent No.: US 8,996,883 B2
(45) Date of Patent: Mar. 31, 2015

(54) SECURING INPUTS FROM MALWARE

(75) Inventors: Steven L. Grobman, El Dorado Hills, CA (US); Ioannis T. Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 13/994,722

(22) PCT Filed: Nov. 30, 2011

(86) PCT No.: PCT/US2011/062498
§ 371 (c)(1),
(2), (4) Date: Jun. 15, 2013

(87) PCT Pub. No.: WO2013/081589
PCT Pub. Date: Jun. 6, 2013

(65) Prior Publication Data
US 2013/0268777 A1    Oct. 10, 2013

(51) Int. Cl.
*G06F 21/60* (2013.01)
*G06F 21/83* (2013.01)

(52) U.S. Cl.
CPC .............. *G06F 21/602* (2013.01); *G06F 21/83* (2013.01)

USPC .......................................................... 713/189

(58) Field of Classification Search
CPC .................................................... G06F 21/602
USPC .......................................................... 713/189
See application file for complete search history.

(56) References Cited

U.S. PATENT DOCUMENTS

| | | | |
|---|---|---|---|
| 7,779,252 B2 | 8/2010 | O'Brien | |
| 8,456,429 B2 | 6/2013 | Whytock | |
| 2006/0123465 A1 | 6/2006 | Ziegler | |
| 2010/0109920 A1 | 5/2010 | Spradling | |
| 2011/0025610 A1* | 2/2011 | Whytock et al. | 345/173 |
| 2011/0194687 A1* | 8/2011 | Brothers | 380/44 |

OTHER PUBLICATIONS

PCT International Search Report and Written Opinion issued in corresponding PCT/US2011/062498 dated Jul. 24, 2012, (10 pages).

* cited by examiner

*Primary Examiner* — Jacob Lipman
(74) *Attorney, Agent, or Firm* — Trop, Pruner & Hu, P.C.

(57) ABSTRACT

A series of touch panel key entries may be secured by shuffling touch entry coordinates. In one embodiment, the entries may be secured by applying a shuffling algorithm that replaces the true coordinates with other incorrect coordinates. Then the correct data may be reassembled in a secure environment.

28 Claims, 2 Drawing Sheets

SECURING INPUTS FROM MALWARE

BACKGROUND

This relates generally to computers and, particularly, to securing computer input data from malware.

Malware is software placed on a computer without the user's permission. The malware may be used by unscrupulous parties to obtain secure information. That secure information can then be used to compromise bank accounts and other limited or controlled access files and web pages. For example, when the user enters a code to access a bank account, the malware may trap the key entries on a touch screen and then use those key entries to transfer money from the user's bank account to a bank account controlled by the parties sponsoring the malware.

DETAILED DESCRIPTION

In accordance with some embodiments, secure two or more dimensional input data may be safely entered, using a small domain cryptographic engine, through an interface such as touch screen interface. Other interfaces include a gesture recognition interface, mouse cursor input interfaces or other applications, including those where inputs may be converted into coordinates. A small domain cryptographic engine is computer software or hardware used to obscure two or more dimensional input data entries. A small domain has a domain size, number of data elements, or input domain or range of less than a billion (far less than conventional cryptographic algorithms, such as Advanced Encryption Standard).

In some embodiments, the technique used to secure touch screen inputs does not impair the user's experience. In other words, the user does not know anything different is happening and the user does not have to input the data in any different way.

Host-based operating systems can utilize standard driver stacks to communicate with the touch input events, in some embodiments. In addition, in some embodiments, the underlying operating system framework's ability to route touch events without comprehending that they are secure is maintained. In some cases, application developers can use standard graphical user interface development tools to easily comprehend this technique and allow for auto-sizing of secure regions so that the secure input capability can be integrated with various operating systems, such as Android, Meego, and iOS.

In some embodiments, when touch inputs are received in a secure area of the screen, the coordinates of the touch inputs may be shuffled using one of a variety of available shuffle algorithms. A shuffle algorithm changes the order of data inputs, such as the coordinates of a touch screen contact. The shuffled touch inputs are then provided to the host software. If the host software needs to use the touch inputs, the host software can use a secure engine to unshuffle the touch inputs.

Figure 1:
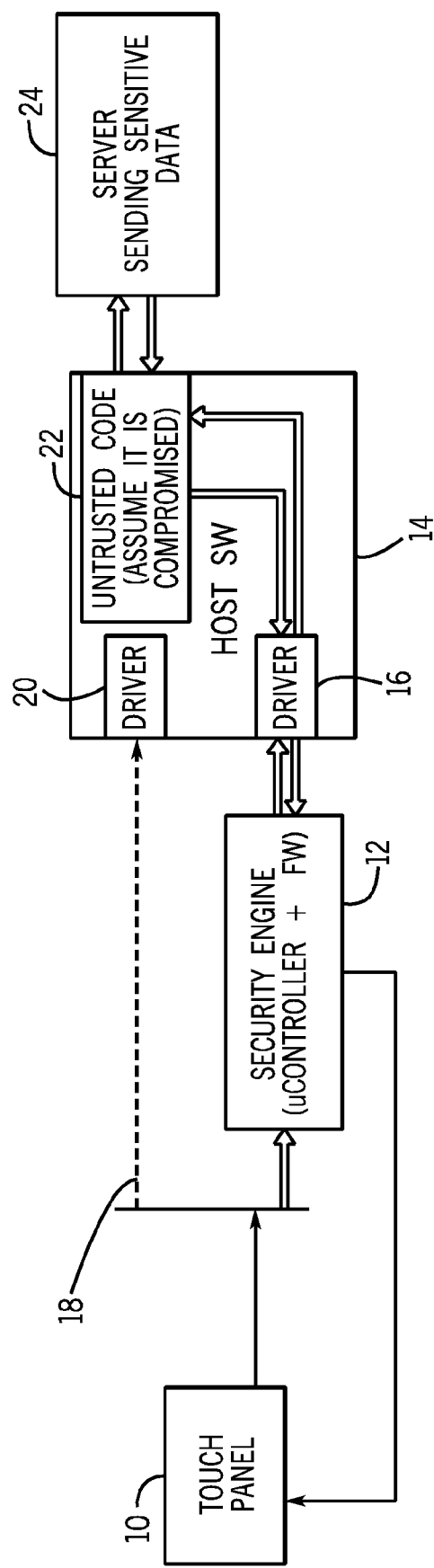
FIG. 1 is a schematic depiction of one embodiment of the present invention.

Referring to FIG. 1, the touch panel 10 may have a touch input space with coordinates running from (0,0) in the lower left hand corner to (1920,1080) in the upper right hand corner, in one embodiment. Other mechanisms for providing touch panel coordinates may also be used. The coordinates of the user's touch accesses to the touch panel may be sent as raw coordinates. The raw coordinates may be provided to a security engine 12, which includes a microcontroller and firmware, in one embodiment. In one embodiment, the coordinates are sent from the touch panel to the security engine over an Inter-Integrated Circuit (I2C) bus.

The security engine determines whether the touch inputs were entered in a secure area of the current display on the touch panel. It can be advised of this by the host software 14. If a secure area is being accessed, the coordinates of the touch panel accesses are shuffled by the security engine using a shuffle algorithm, such as Knuth shuffle or Thorp shuffle, to give two examples.

In one embodiment, the security engine 12 may include a secure hardware controller that is a discrete component or part of a processor that is dedicated to creating an isolated environment. As another example, the security engine may be a software-based secure controller that creates a software isolated secure environment, for example by using virtualization to create an embedded operating system. The security engine may be part of a touch screen in one embodiment.

In one embodiment, the hardware touch screen 10 is not directly exposed to the host software 14, but, rather, remapped to a secure environment that will manipulate the data stream when coordinates are deemed to fall within a secure area of the screen. When coordinates falls within the secure region of the screen, a cryptographic shuffle may be applied to either or both of the X or Y coordinates in a rectangular coordinate embodiment. The cryptographic shuffle or small domain cipher may enable strong cryptographic mapping on small data sets, but with the property that there is an exact one to one mapping of encrypted content to decrypted content and vice versa.

The cryptographic shuffle may use Advanced Encryption Standard (AES) as the keying function to determine shuffle order, in one embodiment. The shuffle remaps the coordinates of the touch event on a protected region of the screen to a new set of coordinates that are still within the same protected region in one embodiment. The remapped coordinates cannot be translated back to the true coordinates unless a key is known, for example. By maintaining the region of the remapped coordinates within the secure input/output portion of the screen, the remapped coordinates are passed throughout the software stack and appear simply as touch events that occurred on other portions of the screen. Thus, it is very difficult for malware to trap secure coordinates in order to deduce secure data entry.

In some embodiments, each coordinate maps to a new encrypted coordinate. Thus, touch events with close proximity are mapped to completely unrelated coordinates in some embodiments. In fact, numerous presses of the same key of a virtual keypad can result in radically different coordinates in the shuffled set, in some embodiments. In other embodiments, the input coordinates can be adjusted to translate them to the center of the virtual key when they are offset on the virtual key image on the touch screen.

A secure service, such as a financial institution, that needs to decode the true input may process it as follows, for example, using the security engine 12 in a system like that shown in FIG. 1. The symmetric key may be shared with a security controller, such as the microcontroller that is part of the security engine 12, used to define a transform. Then an identical mapping table may be implemented based on the cryptographic shuffle known to be implemented in the secure environment. A reverse transform is performed to obtain the true coordinates that were pressed on the touch screen. The touch event may be interpreted based on the type of data entry that the user was executing, such as virtual keypad, pin pad, signed physical signature, or whatever.

While the example described above relates to standard rectangular coordinates, the same techniques can be used in any coordinate system, such as polar, to secure a round portion of the screen or even three dimensional coordinates that would enable the same techniques to be used for secure gesture input.

Additionally, to assure the user that the input will be secure, unique indicators on the screen may be produced to indicate that the secure input area will indeed be subject to cryptographic protection. For example, the virtual keyboard under the control of secure environment can contain a unique image watermark that has been securely provisioned in the secure execution environment.

Thus, in some embodiments, the user gets a native input experience as the screen data does not need to be randomized. Moreover, in some embodiments, free mixing of secure and insecure events may be allowed and the only data needed by the secure environment is from the area of the screen which is associated as a security region. From the developer's perspective, the same touch event application program interfaces and frameworks may be used to interact with the hardware. The only difference is that the host software needs to understand that coordinates within a secure region should be sent to a secure application for decoding.

The security engine may output the shuffled touch events to a driver 16, which then provides the data to untrusted code 22. The code 22 may be assumed to have been compromised.

Alternatively, the touch panel inputs that do not go to the secure area may be routed directly via path 18 (by-passing the security engine 12) to an operating system driver 20 within the host software 14 stack. A server 24 may send sensitive data to the host software 14. Note that the raw coordinates may be handled by an on-chip block connected through an on-chip fabric or other similar fabric, in some embodiments.

In one embodiment, a pseudo code for implementing an embodiment of the present invention is as follows:

```
public void Shuffle(byte RawKeyIn[ ]) throws GeneralSecurityException
{
Cipher ecipher = Cipher.getInstance("AES/CBC/PKCS5Padding");
Key skey = new javax.crypto.spec.SecretKeySpec(RawKeyIn, "AES");
    ecipher.init(Cipher.ENCRYPT_MODE, skey);
    int C, SwapElement, tmp;
    ByteBuffer toProcess = ByteBuffer.allocate(16); //AES Block Size
    toProcess.putInt(4, 0); // Clear out Bytes we are not using
    toProcess.putInt(8, 0);
    toProcess.putInt(12, 0);
    // SHUFFLE X Coordinates
    // For Simplicity - shuffle with Knuth Shuffle off of AES - Could
    also do a Thorp for (C=0;C<XDim;C++)
    {
        toProcess.putInt(0, C);
        byte encrypted[ ] = ecipher.doFinal(toProcess.array( ));
        ByteBuffer encryptedBB = ByteBuffer.wrap(encrypted);
        SwapElement = (int) (((long)encryptedBB.getInt(0) &
        0xffffffffL) % XDim);
        tmp = XList[SwapElement];
        XList[SwapElement] = XList[C];
        XList[C] = tmp;
    }
    // SHUFFLE Y Coordinates
    // For Simplicity - shuffle with Knuth Shuffle off of AES - Could also
    do a Thorp for (C=0;C<YDim;C++)
    {
        toProcess.putInt(0, C);
        byte encrypted[ ] = ecipher.doFinal(toProcess.array( ));
        ByteBuffer encryptedBB = ByteBuffer.wrap(encrypted);
```

-continued

```
        SwapElement = (int) (((long)encryptedBB.getInt(0) &
        0xffffffffL) % YDim);
        tmp = YList[SwapElement];
        YList[SwapElement] = YList[C];
        YList[C] = tmp;
    }
}
```

Figure 2:
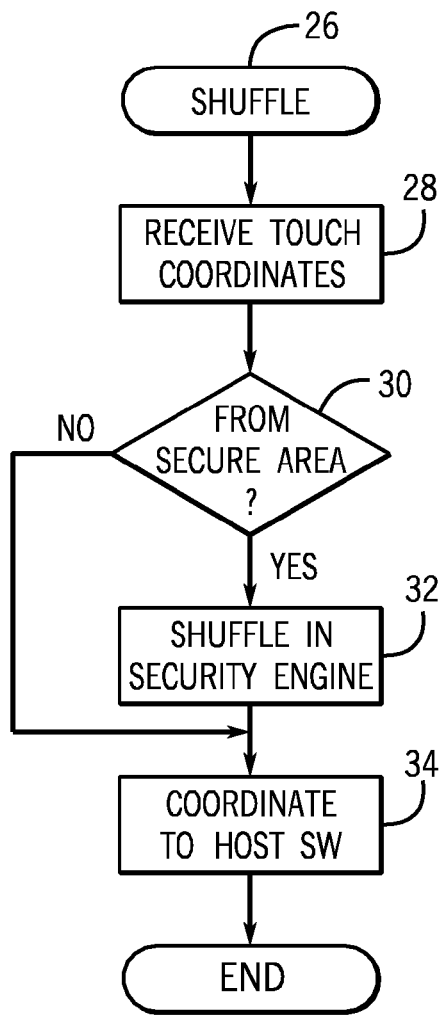
FIG. 2 is a flow chart for a shuffle algorithm in accordance with one embodiment of the present invention.

Referring to FIG. 2, a sequence 26 for shuffling the key input coordinates may be implemented in software, firmware, and/or hardware. In firmware and software embodiments, the sequence may be implemented by computer executed instructions stored in one or more non-transitory computer readable media, such as a magnetic, optical, or semiconductor memory. In the embodiment shown in FIG. 1, a software or firmware sequence may be stored in a security engine 12 in one embodiment.

The shuffle sequence 26 beings by receiving touch coordinates, as indicated in block 28. A check at diamond 30 determines whether the coordinates are the result of using a secure entry mode. A secure entry is any data input indicated to be secure. An example of a secure entry mode may be touch inputs in the secure region of the display. Another example of a secure entry mode includes making an input selection designating the entries as being secure. If the coordinate were designated as a secure entry, the coordinates are shuffled in the security engine, as indicated in block 32. Then the shuffled coordinates may be passed to the host software 14 (FIG. 1), in the case where the inputs were shuffled (i.e. they go by path 18 to driver 20, in FIG. 1), as indicated in block 34. If the inputs were not shuffled, unshuffled inputs are provided to the host software 14 in one embodiment.

Figure 3:
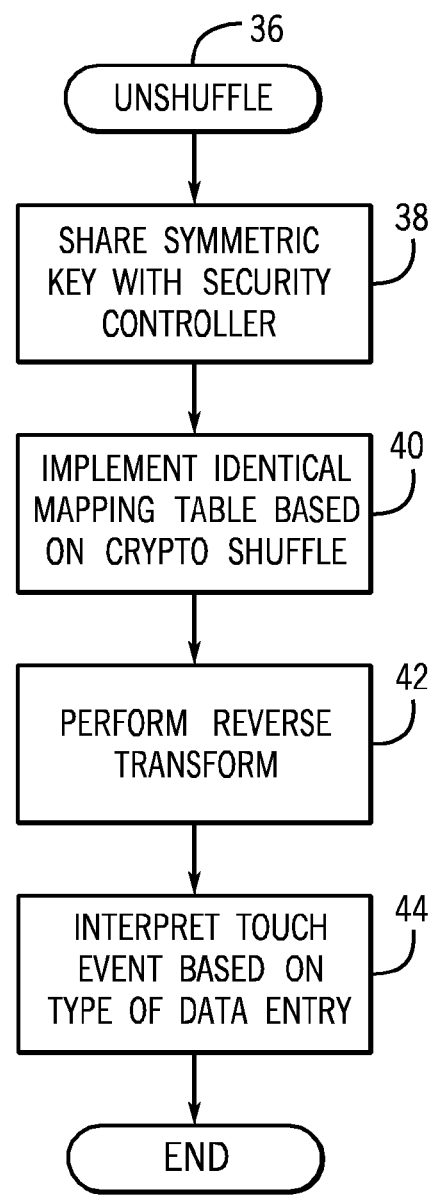
FIG. 3 is a flow chart for an unshuffle algorithm in accordance with one embodiment of the present invention.

A sequence 36 shown in FIG. 3 may be used by the receiver of the key events to unshuffle the input key events. For example, a server at a website may receive the key events and may need to decode the key events. It may use an apparatus similar to that shown in FIG. 1 and a security engine corresponding to the security engine 12 (FIG. 1), in one embodiment. The sequence 36 may be implemented in firmware, software, and/or hardware. In firmware and software embodiments, the sequence may be implemented as computer executed instructions stored in one or more non-transitory computer readable media, such as a magnetic, optical, or semiconductor storage. Again, in software or firmware embodiments that can be secured may be stored in a security engine 12 (FIG. 1).

The sequence begins by sharing the symmetric key with the security controller, as indicated in block 38. Then the identical mapping table that was used to create the key sequence may be implemented based on the cryptographic shuffle that was used to produce the shuffled result, as indicated in block 40. A reverse transform is performed at block 42. Then the touch event is interpreted based on the type of data entry, as indicated in block 44.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
securing a series of input touch screen coordinates in a protected screen region by remapping the coordinates to different coordinates within the protected region.

2. The method of claim 1 including shuffling using one of a Thorp or Knuth shuffle.

3. The method of claim 1 including shuffling in a secure environment.

4. The method of claim 1 including sharing a symmetric key to recover said entries.

5. The method of claim 4 including using a mapping table to recover the coordinates of said entries.

6. The method of claim 1 including shuffling a series of touch panel entries.

7. The method of claim 6 including shuffling coordinates that indicate where a touch panel was touched.

8. The method of claim 6 including detecting whether the entries were made in a secure touch panel region.

9. The method of claim 8 including shuffling only entries made in the secure touch panel region.

10. At least one non-transitory computer readable medium storing instructions executed by a computer to:
secure a series of input touch screen coordinates in a protected screen region by remapping the coordinates to different coordinates within the protected region.

11. The medium of claim 10 further storing instructions to shuffle using one of a Thorp or Knuth shuffle.

12. The medium of claim 10 further storing instructions to shuffle in a secure environment.

13. The medium of claim 10 further storing instructions to share a symmetric key to recover said entries.

14. The medium of claim 10 further storing instructions to shuffle a series of touch panel entries.

15. The medium of claim 14 further storing instructions to shuffle coordinates that indicate where a touch panel was touched.

16. The medium of claim 12 further storing instructions to detect whether the entries were made in a secure screen region.

17. The medium of claim 16 further storing instructions to shuffle only when the entries were made in a secure screen region.

18. The medium of claim 10 further storing instructions to shuffle one of polar coordinates, three dimensional coordinates, or gesture coordinates.

19. The medium of claim 13 further storing instructions to use a mapping table to recover the coordinates of said entries.

20. An apparatus comprising:
a security engine to shuffle touch screen coordinates in a protected screen region by remapping the coordinates to different coordinates within the protected region; and
a device to detect whether the inputs were made using a secure entry mode.

21. The apparatus of claim 20 wherein said device to detect when inputs were made to a secure display area.

22. The apparatus of claim 20 wherein said security engine does not shuffle inputs not made using a secure entry mode.

23. The apparatus of claim 20 to shuffle using a security engine that is a small domain cryptographic security engine.

24. The apparatus of claim 20, said engine to shuffle using one of a Thorp or Knuth Shuffle.

25. The apparatus of claim 20, said engine to shuffle coordinates that indicate where a touch screen was touched.

26. The apparatus of claim 20 to display a watermark when said security engine is operating to shuffle inputs.

27. The apparatus of claim 20 including a secure and a non-secure data entry mode.

28. The apparatus of claim 20 including host software, said security engine to shuffle said inputs before said inputs are accessible to host software.

\* \* \* \* \*